United States Patent
Karlberg et al.

(10) Patent No.: US 12,164,534 B2
(45) Date of Patent: Dec. 10, 2024

(54) IDENTIFICATION RESOLUTION IN DISTRIBUTED KNOWLEDGE GRAPHS

(71) Applicant: Microsoft Technology Licensing, LLC, Redmond, WA (US)

(72) Inventors: Jan-Ove Almli Karlberg, Tromso (NO); Theodoros Gkountouvas, Tromso (NO); Anders Tungeland Gjerdrum, Tromso (NO); Tor Kreutzer, Harstad (NO); Vincent Mulwa Kyalo, Nairobi (KE); Vincent Macharia Karuri, Nairobi (KE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/124,683

(22) Filed: Mar. 22, 2023

(65) Prior Publication Data

US 2024/0320230 A1 Sep. 26, 2024

(51) Int. Cl.
*G06F 16/2458* (2019.01)
*G06F 16/2457* (2019.01)

(52) U.S. Cl.
CPC .... *G06F 16/2471* (2019.01); *G06F 16/24573* (2019.01)

(58) Field of Classification Search
CPC ........................ G06F 16/2471; G06F 16/24573
See application file for complete search history.

(56) References Cited

U.S. PATENT DOCUMENTS

| | | | |
|---|---|---|---|
| 8,595,262 B1 * | 11/2013 | Hayden | G06F 16/2471 370/254 |
| 9,576,007 B1 * | 2/2017 | Sivathanu | G06F 16/2228 |
| 2011/0228668 A1 * | 9/2011 | Pillai | G06F 11/2023 370/217 |
| 2013/0124561 A1 | 5/2013 | Pradhan | |
| 2014/0310259 A1 * | 10/2014 | Tian | G06F 16/2471 707/718 |

(Continued)

OTHER PUBLICATIONS

Corbya, Olivier, and Catherine Faron-Zuckerb. "KGRAM: a Generic SPARQL Interpreter for Linked Data Querying and Mashup." (Year: 2010).*

(Continued)

*Primary Examiner* — William Spieler
(74) *Attorney, Agent, or Firm* — NovoTechIP International PLLC

(57) ABSTRACT

The disclosed technology is generally directed to identification resolution in distributed knowledge graphs. In one example of the technology, a graph query is received. A metagraph includes identifier acceptance information associated with which identifiers among the identifiers are accepted by the data stores in the plurality of data stores and identifier export information associated with which identifiers among the identifiers are exported by the data stores in the plurality of data stores. The metagraph and the cost information are used to select, from among query paths, a query path that is capable of fulfilling the graph query based on minimizing a cost according to a cost metric. Upon determining that a failure has occurred in the selected query path, the metagraph and the cost information are used to change the selected query path. A response to the graph query is provided based on the selected query path.

20 Claims, 5 Drawing Sheets

(56) References Cited

U.S. PATENT DOCUMENTS

| | | |
|---|---|---|
| 2014/0337373 A1 | 11/2014 | Kim et al. |
| 2020/0117737 A1* | 4/2020 | Gopalakrishnan ............ G06F 16/9535 |
| 2020/0151189 A1* | 5/2020 | Kramer ............ G06F 16/258 |
| 2020/0226156 A1 | 7/2020 | Borra et al. |

OTHER PUBLICATIONS

Iglesias, Enrique, Samaneh Jozashoori, and Maria-Esther Vidal. "Scaling up knowledge graph creation to large and heterogeneous data sources." Journal of Web Semantics 75 (2023): 100755. (Year: 2023).*

Mami, Mohamed Nadjib. Strategies for a Semantified Uniform Access to Large and Heterogeneous Data Sources. Diss. Universitäts- und Landesbibliothek Bonn, 2021. (Year: 2021).*

"Application as Filed in U.S. Appl. No. 17/847,146", Filed Date: Jun. 22, 2022, 58 Pages.

"Application as Filed in U.S. Appl. No. 18/150,789", Filed Date: Jan. 5, 2023, 47 Pages.

"Application as Filed in U.S. Appl. No. 63/381,511", Filed Date: Oct. 28, 2022, 46 Pages.

International Search Report and Written Opinion received for PCT Application No. PCT/US2024/019311, Jul. 8, 2024, 19 pages.

* cited by examiner

IDENTIFICATION RESOLUTION IN DISTRIBUTED KNOWLEDGE GRAPHS

BACKGROUND

A distributed knowledge graph may be used to tie together knowledge, resources, people, and the like. In such a structure, entities are typically presented as nodes, and relationships between those entities are presented as edges in a view of the distributed knowledge graph, which is maintained by a graph database that is distributed across multiple data stores. The distributed knowledge graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, or the like.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to identification resolution in distributed knowledge graphs, as follows according to some examples. A graph query is received. The graph query is associated with a distributed graph of a system. The system includes a plurality of data stores. The graph query includes a request for data. A metagraph is provided such that the metagraph includes identifier information that is associated with identifiers. The identifier information includes identifier acceptance information that is associated with which identifiers among the identifiers are accepted by the data stores in the plurality of data stores, and the identifier information further includes identifier export information that is associated with which identifiers among the identifiers are exported by the data stores in the plurality of data stores. Cost information that is associated with costs of query paths among the data stores is obtained according to at least a first cost metric. The metagraph and the cost information are used to select, from among the query paths, a query path that is capable of fulfilling the graph query based on minimizing a cost according to the first cost metric. Upon determining that a failure has occurred in the selected query path, the metagraph and the cost information are used to change the selected query path. A response to the graph query is provided based on the selected query path. The response to the graph query includes the data.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
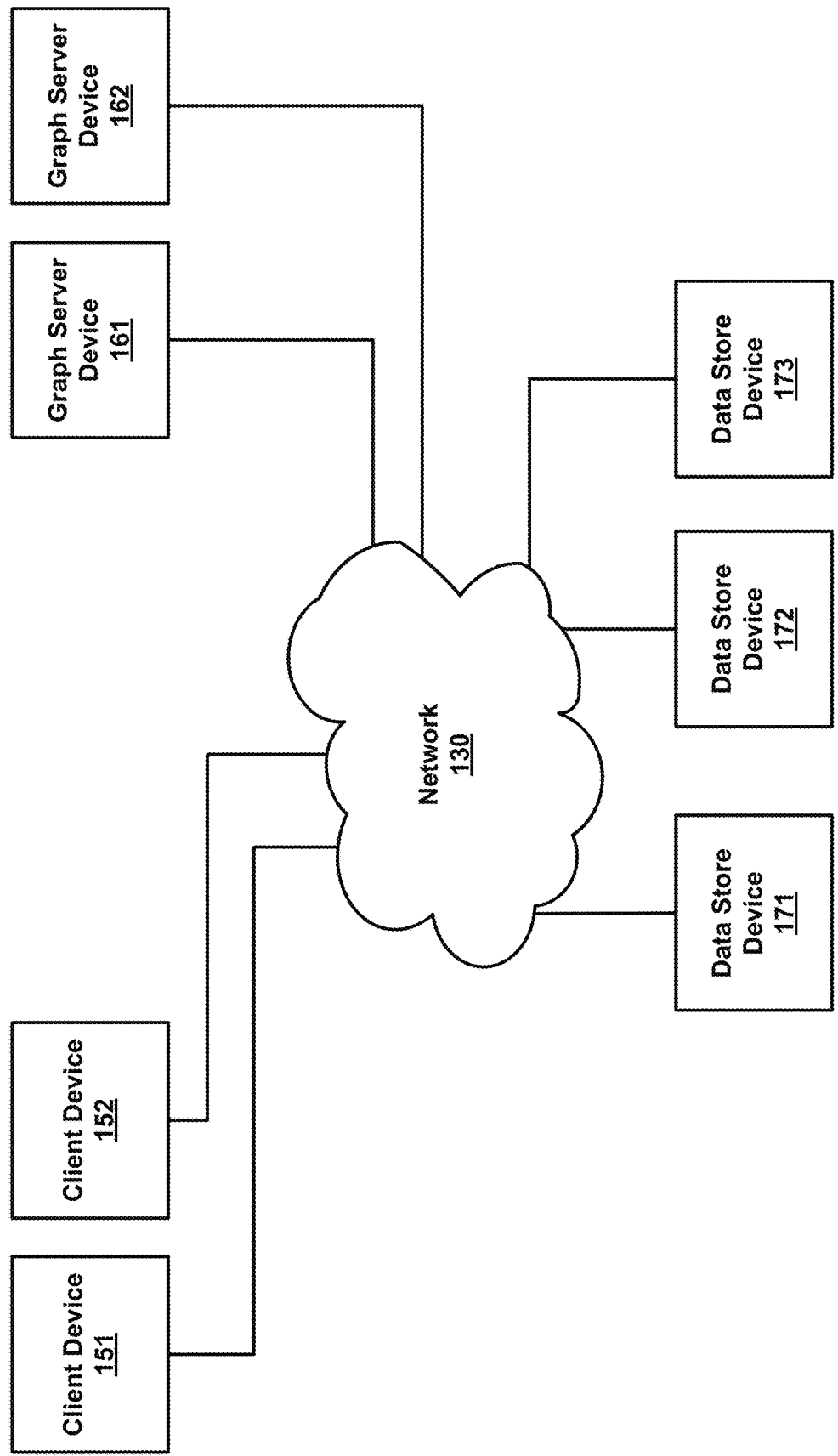
FIG. 1 is a block diagram illustrating an example of a network-connected system.

A productivity service may provide various services to users of the productivity service. For instance, the productivity service may provide various services to users. The various services may include cloud services, access to various applications, communications services, security services, device management services, file services including the storing, access, and sharing of files by the users, or the like.

A distributed knowledge graph may be used to tie together knowledge, resources, people, and the like. In the structure of the distributed knowledge graph, entities are typically presented as nodes, and relationships and actions between those entities are presented as edges. The graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, or the like. The distributed knowledge graph may be used as follows in some examples.

The distributed knowledge graph maps data for a number of systems. The systems include a plethora of heterogeneous data stores, each built according to the specific requirements of the data hosted within it. Using the graph to locate an entity modelled on the graph makes use of identifiers that acts as keys. The identifiers used to locate a particular logical entity or edges to/from these nodes vary across the data stores. For instance, in some examples, a mail storage system is optimized to have data retrieved by email address, the directory system uses a globally unique ObjectId, and several other systems each use a different identification (ID) entirely. A metagraph is used to expose data from different data stores, including heterogeneous data stores that use different identifiers, as a single, coherent logical graph. The metagraph enables uniquely identifying data in a distributed graph structure while supporting the usage of multiple different identifiers. The metagraph includes, for each data store modeled in the graph, information about which identifiers that data store accepts, and which identifiers that data store exports.

When a graph query that request data spans multiple stores which internally use different IDs for the same logical entity, the graph query may be fulfilled as followed. A query planner identifies the data stores that must be visited in order to retrieve the data. The query planner uses the metagraph to determine which identifiers those data stores accept when being queried. In this way, the query planner uses this information to determine possible query paths based on which identifiers the data stores accept and which identifiers the data stores export. The query paths are sets of ID-resolutions/translations that are traversed in order to satisfy the graph query.

The query planner then uses cost information to automatically determine the optimal query path according to a particular cost metric, such as latency, freshness, $CO_2$ emissions, monetary cost, or another suitable cost metric. In the case of a service outage in path of the query path determined to be optimal, the query planner instead determines a different query path. The determined query path is then executed in order to fulfill the graph query and provide the requested data in response to the graph query.

Illustrative Systems

FIG. 1 is a block diagram illustrating an example of a system (100). FIG. 1 and the corresponding description of FIG. 1 in the specification illustrate an example system for illustrative purposes that does not limit the scope of the disclosure. System 100 includes network 130, as well as client devices 151 and 152, graph server devices 161 and 162, and data store devices 171, 172, and 173, which all connect to network 130.

Figure 5:
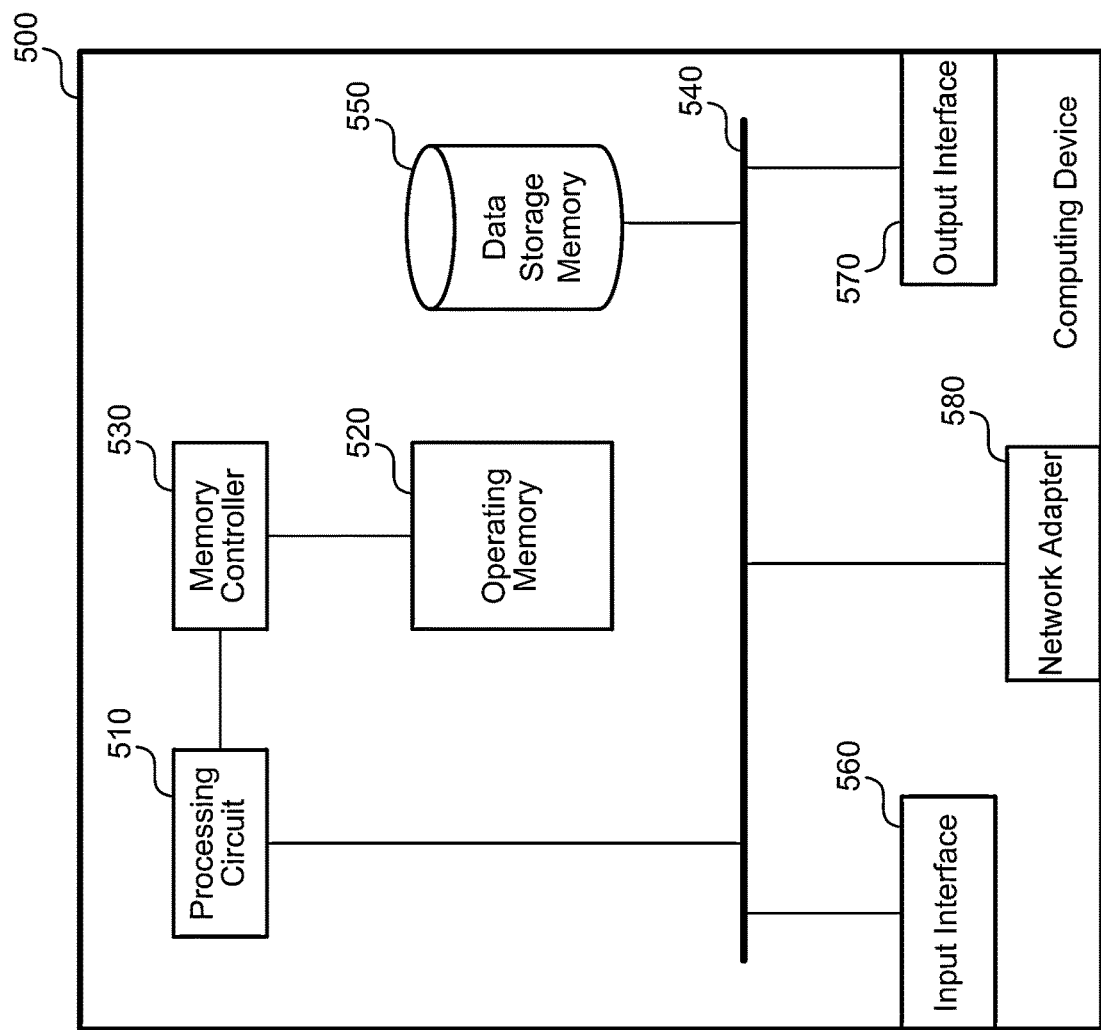
FIG. 5 is a block diagram illustrating one example of a suitable computing device, according to aspects of the disclosed technology.

Each of client devices 151 and 152, graph server devices 161 and 162, and data store devices 171, 172, and 173 include examples of computing device 500 of FIG. 5. Graph server devices 161 and 162 and data store devices 171, 172, and 173 are each part of one or more distributed systems.

Data store devices 171, 172, and 173 are part one or more services that are provided on behalf of users. Users may access the services by communicating with the services via one or more devices, such as client device 151 and client device 152. Among other things, the services may include cloud services, access to various applications, communications services, security services, device management services, file services including the storing, access, and sharing of files by the users, or the like. Data associated with the services are stored in various data stores that includes data store devices, including data store devices 171, 172, and 173. In some examples, the data stores include a plethora of heterogeneous data stores, each built according to the specific requirements of the data hosted within it.

A graph server may use a distributed knowledge graph to tie together knowledge, resources, people, and the like that are associated with the data stores. The graph server includes devices, such as graph server device 161 and graph server device 162. The graph server includes a query planner, and the graph server creates and updates a metagraph. The metagraph enables the query planner to uniquely identify data in the graph structure while supporting the usage of multiple different identifiers by the data stores.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among client devices 151 and 152, graph server devices 161 and 162, and data store devices 171, 172, and 173. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
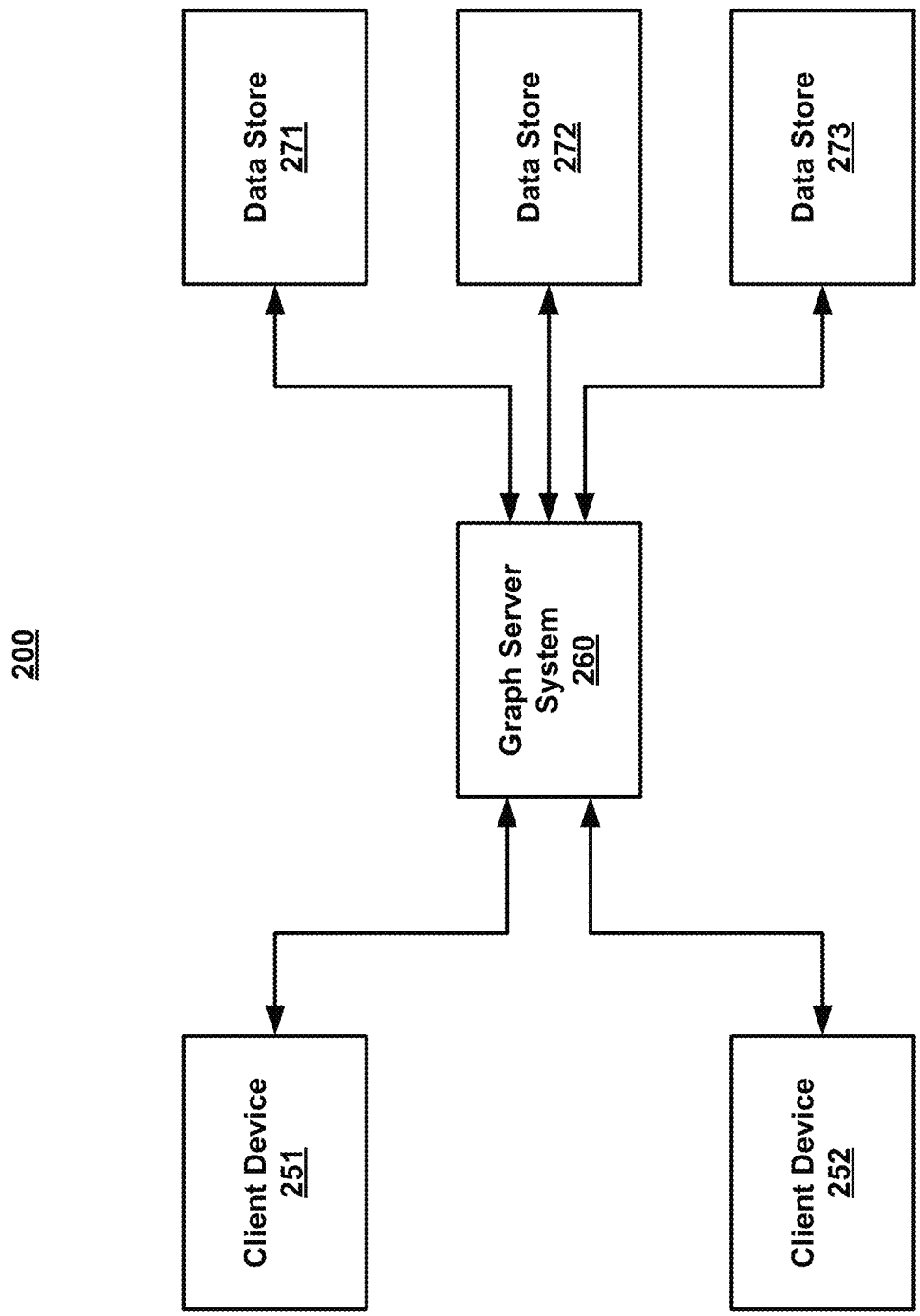
FIG. 2 is a block diagram illustrating an example of a system for identification resolution in distributed knowledge graphs.

FIG. 2 is a block diagram illustrating an example of a system (200). System 200 may be an example of system 100 of FIG. 1. System 200 is described as follows in accordance with some examples. System 200 includes client devices 251 and 252, graph server system 260, and data stores 271, 272, and 273. Graph Server System 260 and data stores 271, 272, and 273 may be or be included in one or more distributed systems.

Data stores 271, 272, and 273 are part one or more services that are provided on behalf of users. Users may access the services by communicating with the service via one or more devices, such as client device 251 and client device 252. Among other things, the services may include cloud services, access to various applications, communications services, security services, device management services, file services including the storing, access, and sharing of files by the users, or the like. Data associated with the services are stored in various data stores that includes data stores, including data stores 271, 272, and 273. The data stores include a plethora of heterogeneous data stores, each built according to the specific requirements of the data hosted within it. Graph server system 260 operates as follows in some examples.

Graph server system 260 uses a distributed knowledge graph to tie together knowledge, resources, people, and the like that are associated with a system that includes the data stores (e.g., data stores 271, 272, and 273). The distributed knowledge graph includes a graph structure description that resides on a graph database on graph server system 260. The graph database may include, in various aspects: a relational database, a not-only-Structured-Query-Language (NoSQL) database, or another suitable database. In the structure of the distributed knowledge graph, entities are modelled as nodes. The entities modeled as nodes include users, documents and other files, and the like. Each of the nodes describes the corresponding entity and includes a set of accompanying properties of the corresponding entity, such as names, titles, ages, addresses, or the like. Each property can be considered a key/value pair that includes a name of the property and its corresponding value.

In the structure of the distributed knowledge graph, relationships between the entities and actions between the entities are modeled as edges between those entities. For example, if a user modifies as a document, this is represented in the graph structure with an edge between the user and the document, with the edge indicating that the user has modified the document. Similar, authorship of a document by a user is represented in the graph structure as an edge between the user and the document, with the edge indicating the authorship, and a view of a document by a user may be represented in the graph structure as an edge indicating the document view.

The distributed graph stored in graph server system 260 is a logical schema that models entities as nodes, and the distributed graph models relationships and actions between nodes as edges. Graph system 260 includes a storage adapter that onboards information about new data stores into the distributed graph. The storage adapter also updates the distributed graph for changes in the nodes and edges, and the storage adapter handles communication with the underlying data store.

The distributed graph may be periodically queried by users via graph queries to learn about the relationships between entities. A graph query enables a user to query for data associated with the distributed knowledge graph. For example, a user may issue a graph query to find friends or contacts within a social network, the documents that a given user has interacted with, the users that a given document has been accessed by, the users that a given document has been accessed by within a specified time frame, the entities that satisfy various search criteria, or the like. Graph server 260 executes such graph queries that are submitted by users.

The distributed graph stored in graph server system 260 is a logical schema that models entities as nodes, and models relationships and actions between nodes as edges, but the distributed graph does not itself store the data held in the data stores 260. Accordingly, execution of the graph query requires graph server 260 to locate and communicate with the data stores that hold the data. Using the graph to locate an entity modelled on the graph makes use of identifiers that acts as keys. The identifiers used to locate a particular logical entity or edges to/from these nodes vary across the data stores. In various examples, the data stores may include a variety of different data stores such as an email storage system, a directory system, a document management system, and a variety of other types of data stores. In some examples, the mail storage system is optimized to have data retrieved by email address, the directory system uses a globally unique ObjectId, and several other systems each use a different ID entirely.

Graph server system 260 creates a metagraph, which contains identifier information about how the data stores interact with identifiers. More specifically, for each data store modeled in the graph, the identifier information in the metagraph includes identifier acceptance information that indicates which identifiers, if any, that data store accepts. Additionally, for each data store modeled in the graph, the identifier information in the metagraph includes identifier export information that indicates which identifiers, if any, that data store exports—that is, which identifiers of entities the data stores outputs. In some examples, the metagraph is a graph that stores the information about the data stores and corresponding identifier information as edges and nodes. In other examples, the metagraph provides identifier information in other ways. The metagraph may be interchangeably referred to as an ID resolution graph.

In some examples in which the metagraph is a graph that models the information about the data stores and corresponding identifier information as edges and nodes the metagraph models the information as follows. The metagraph is a bipartite graph in which data stores are represented/modeled as nodes having the label System, and identifiers are modeled as nodes with the label Identifier. Information about which identifiers are accepted by a data store are modeled as edges of type ACCEPTS in the metagraph, with the edge going from an Identifier node of the identifier to a System node of the data store that accepts that identifier. Similarly, information about which identifiers are exported by a data store are modeled as edges of type EXPORTS in the metagraph, with the edge going from an Identifier node of the identifier to a System node of the data store that exports that identifier.

A client device such as client device 251 may send a graph query to graph server system 260. Upon receiving/accessing a graph query, the query planner running in graph server system 260 determines which data stores must be visited in order to retrieve the data that is being requested in the graph query. The query planner then accesses and uses the metagraph and cost information to determine possible query paths to satisfy the graph query.

One example of a graph query that involves people data and that spans more than one data store is as follows:
    MATCH (me)-[:Has_Contact]→(c:Contact)-[:Modified]→(doc: Document)
    WHERE c.Name='Alice'
    RETURN doc. Title This example graph query is written in the language Cypher. In various other examples, any suitable language, such as any suitable pattern-matching language, may be employed. This example graph query requests documents be retrieved for which any contacts of the user named "Alice" have modified the document. In the example graph query, "me" refers to the user making the graph query, "Has_Contact" refers to a relationship that one user has contact with another user, and "Modified" refers to a relationship that a user has modified a document. For the example graph query, the contacts and the HasContact relationship is stored in the ContactStore data store. The ContactStore data store refers to users by the SMTPs of the users. The Modified relationship and the documents are stored in another data store, the DocumentGraph data store.

The DocumentGraph data store has user interactions with documents that are keyed on the object ID of users. However, using only the ContactStore data store and the DocumentGraph data store, there is no way to execute the distributed graph query since there is no translation from the SMTP of the contact to its object ID, which is required for the second leg of the query. To complete the query, the execution must make use of an alternative storage system capable of resolving or otherwise translating the SMTP of a user into an object ID of the user. For instance, in some examples, the metagraph may indicate that the Directory data store exports both SMTP and ObjectId, and also accepts both identifiers when being queried. In these examples, the Directory data store may be used to resolve the SMTP into an object ID.

The query planner determines which data stores must be visited/accessed in order to fulfill/satisfy the graph query and retrieve the data. For the example graph query given above, the query planner determines that the ContactStore and DocumentGraph are the data stores that must be visited to fulfill the graph query. The query planner uses the metagraph to determine query paths that will allow the graph query to be fulfilled. As discussed above, the execution must make use of an alternative storage system capable of resolving or otherwise translating the SMTP into an object ID, and so the query path must include such a resolution/translation.

For instance, in some examples, one of the possible query paths for the example graph query includes following three steps. First, each contact of the user having the name "Alice" is found in the data store ContactStore. The ContactStore data store will return the SMTP of each such contact. Next, using the SMTPs retrieved from the ContactStore data store, the object IDs for each of those contacts is resolved. For instance, in some examples, the Directory data store may be used to resolve the SMTPs retrieved from the ContactStore data store into the object IDs for each of those contacts. Third, using these object IDs, the Modified relationship is looked up in the DocumentGraph datastore and followed to the documents that these contacts have modified. Graph server system 260 then returns the title of each of these documents to the client device 251 to fulfill the graph query.

The query planner uses the metagraph and cost information to determine the optimal query path according to a particular cost metric. For example, the particular cost metric may be latency, freshness, carbon emissions, monetary cost, fewest data stores accessed, or another suitable cost metric. "Freshness" refers to how up-to-date the data is. The cost information includes information that can be used to determine the cost of each query path so that the costs of potential query paths can be compared. In some examples, the cost information is separate from the metagraph.

In other examples, the cost information is included in the nodes and edges of the metagraph. In these examples, having the cost information included in the nodes and edges of the metagraph allows the query planner to rely on traditional graph-traversal algorithms for determining the set of ID-resolutions that must take place—for example Breadth First Search (BFS) algorithms, Depth First Search (DFS) algorithms, or weighted traversal algorithms such as Dijkstra's algorithm. In some examples, even when cost metrics are included a nodes and edges of the metagraph, some cost metrics are determined at runtime. For instance, in some examples, latency is tracked at runtime.

The produced paths through the graphs are then used as inputs by the query planner, which attempts to inject the ID-resolution steps at suitable positions in the query path and optimize the complete set of steps that now include ID-resolution/translation. For example, certain ID-resolution operations are executed in parallel with execution of other parts of the query. The query planner uses caching, so that each time a query path is selected by the query planner, the query path is cached. In this way, the same query path be used if the same graph query is subsequently made. Additionally, a relatively large number of nodes may be used to determine query paths in parallel.

In the case of a service outage or other failure in the query path determined to be optimal, the query planner instead determines a different query path. In this way, the query planning does not use a centralized point of failure. In the case of service outages, the query planner uses alternate—but less optimal—paths through the graph as fallbacks in order to provide graceful degradation in the face of errors. After the query planner has determined the query path to be used, graph server system 260 executes the query using the determined query path, and then retrieves the data that has been queried for in the graph query.

Graph server system 260 executes the graph query by the following the selected query path. For instance, an example of the example graph query may be executed as follows in some examples. First, each contact of the user having the name "Alice" is found in the data store ContactStore. The ContactStore data store will return the SMTP of each such context. Next, using the SMTPs retrieved from the Contact-Store data store, the object IDs for each of those contacts is resolved. For instance, in some examples, the Directory data store may be used to resolve the SMTPs retrieved from the ContactStore data store into the object IDs for each of those contacts. Third, using these object IDs, the Modified relationship is looked up in the DocumentGraph datastore and followed to the documents that these contacts have modified. Graph server system 260 then returns the title of each of these documents to the client device 251 to fulfill the graph query.

While a small number of data stores and a small number of identifiers are discussed above by way of example, many examples of system 200 contain significantly more data stores and significantly more identifiers than in the examples illustrated above.

Each time a new data store is added to system 200, the storage adapter in graph server system 260 updates the distributed graph and the metagraph. The storage adapter in graph server system 260 also updates the distributed graph and the metagraph based on changes in the data stores. The updates may be performed periodically, based on receiving a notification of a change, or based on a combination of the above.

Illustrative Processes

Figure 3:
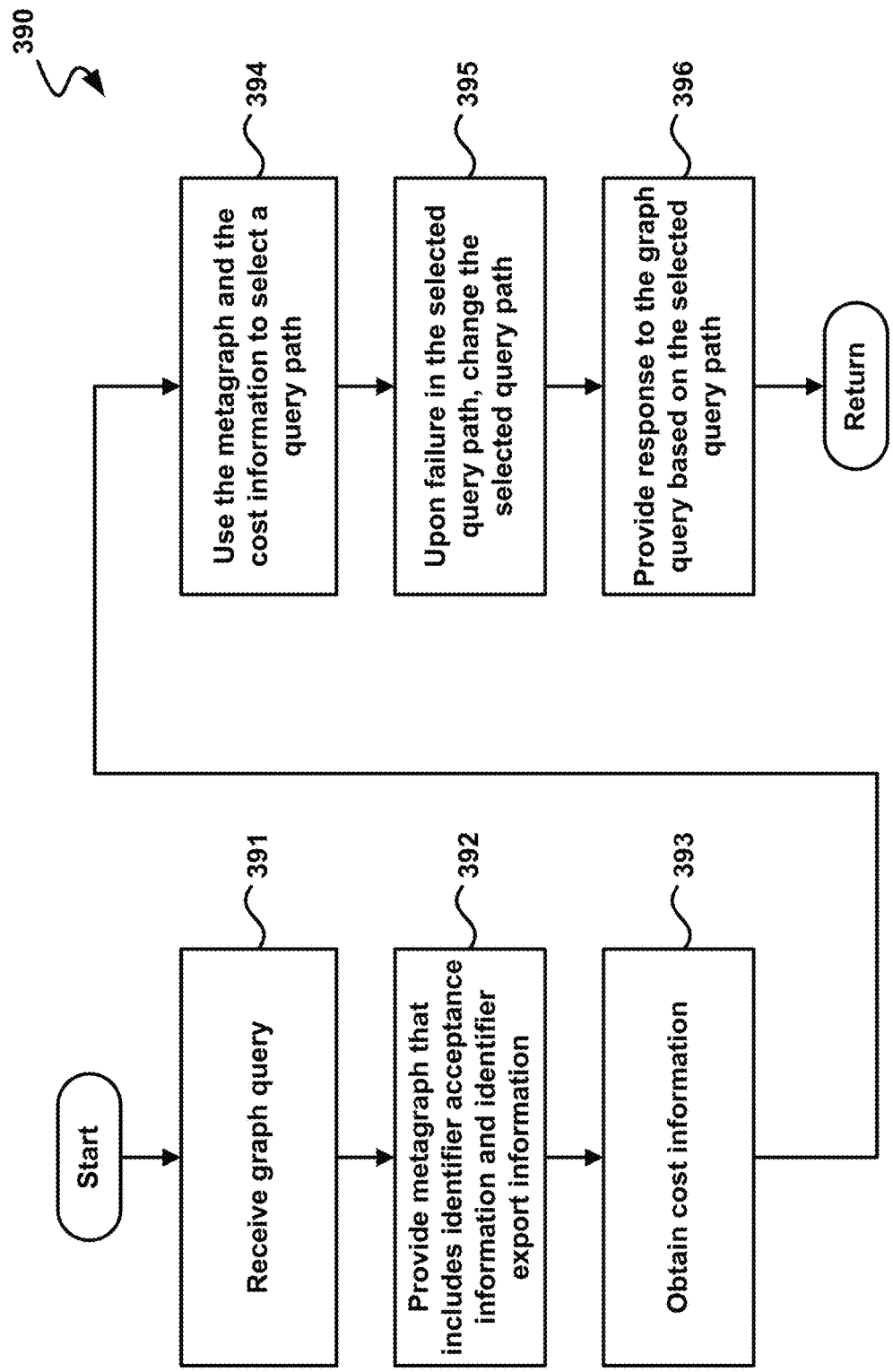
FIG. 3 is a flow diagram illustrating an example process for identification resolution in distributed knowledge graphs.

FIG. 3 is a diagram illustrating an example dataflow for a process (390) for identification resolution in distributed knowledge graphs. In some examples, process 390 may be performed by an example of one of the graph server device devices 161 or 162 of FIG. 1, by an example of graph server system 260 of FIG. 2, by an example of device 500 of FIG. 5, or the like. In some examples, process 390 proceeds as follows.

Step 391 occurs first. At step 391, a graph query is received. The graph query is associated with a distributed graph of a system. The system includes a plurality of data stores. The graph query includes a request for data. As shown, step 392 occurs next. At step 392, a metagraph is provided such that the metagraph includes identifier information that is associated with identifiers. The identifier information includes identifier acceptance information that is associated with which identifiers among the identifiers are accepted by the data stores in the plurality of data stores, and the identifier information further includes identifier export information that is associated with which identifiers among the identifiers are exported by the data stores in the plurality of data stores.

As shown, step 393 occurs next. At step 393, cost information that is associated with costs of query paths among the data stores is obtained according to at least a first cost metric. As shown, step 394 occurs next. At step 394, the metagraph and the cost information are used to select, from among the query paths, a query path that is capable of fulfilling the graph query based on minimizing a cost according to the first cost metric. As shown, step 395 occurs next. At step 395, upon determining that a failure has occurred in the selected query path, the metagraph and the cost information are used to change the selected query path. As shown, step 396 occurs next. At step 396, a response to the graph query is provided based on the selected query path. The response to the graph query includes the data. The process may then advance to a return block, where other processing is resumed.

Illustrative Devices/Operating Environments

Figure 4:
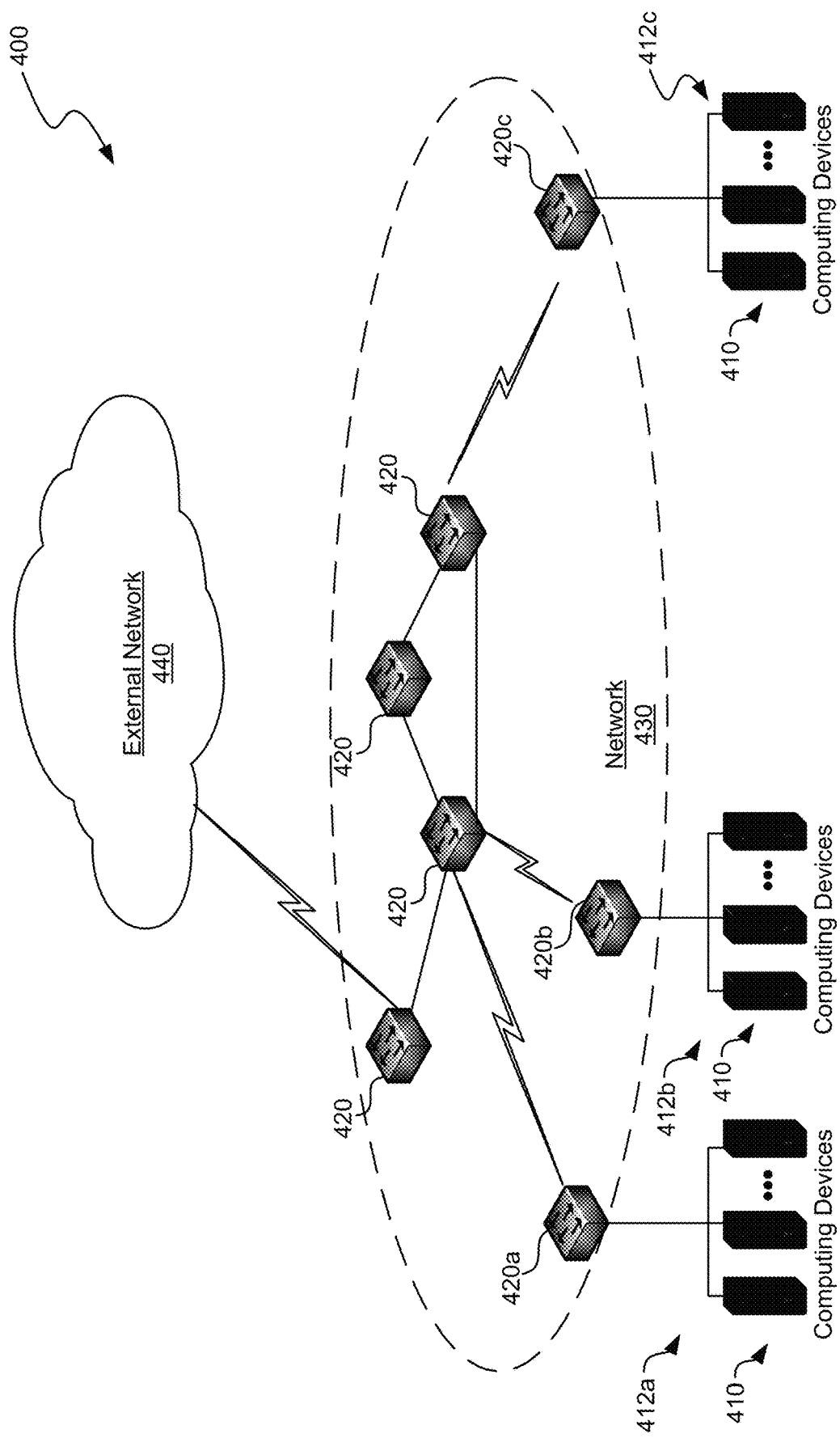
FIG. 4 is a block diagram illustrating one example of a suitable environment in which aspects of the technology may be employed.

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/or other suitable computing services.

In some examples, one or more of the computing devices 410 is a device that is configured to be at least part of a system for identification resolution in distributed knowledge graphs.

Illustrative Computing Device

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the above figures, as discussed in greater detail above and below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., execute In Place (XIP).

Operating memory 520 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for run-time data storage.

Also, computing device 500 may include or be coupled to any type of processor-readable media such as processor-readable storage media (e.g., operating memory 520 and data storage memory 550) and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (I2C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor includes a trusted execution environment, and wherein the processor-executable code includes processor-executable instructions that, in response to execution, enable the device to perform actions, including:
receiving a graph query, wherein the graph query is associated with a distributed graph of a system, wherein the system includes a plurality of data stores, and wherein the graph query includes a request for data;
providing a metagraph such that the metagraph includes identifier information that is associated with identifiers, wherein the identifier information includes identifier acceptance information that is associated with which identifiers among the identifiers are accepted by the data stores in the plurality of data stores, and the identifier information further includes identifier export information that is associated with which identifiers among the identifiers are exported by the data stores in the plurality of data stores;
obtaining cost information that is associated with costs of query paths among the data stores according to at least a first cost metric;
using the metagraph and the cost information to select, from among the query paths, a query path that is capable of fulfilling the graph query based on minimizing a cost according to the first cost metric;
upon determining that a failure has occurred in the selected query path, using the metagraph and the cost information to change the selected query path; and
providing a response to the graph query based on the selected query path, wherein the response to the graph query includes the data.

2. The apparatus of claim 1, the actions further including determining the data stores from among the plurality of data stores that must be accessed in order to retrieve the data.

3. The apparatus of claim 1, wherein the first cost metric includes at least one of latency, carbon emissions, or freshness.

4. The apparatus of claim 1, wherein using the metagraph and the cost information to select, from among the query paths, the query path that is capable of fulfilling the graph query based on minimizing the cost according to the first cost metric is accomplished using at least one of a breadth first search algorithm, a depth first search algorithm, or a weighted traversal algorithm.

5. The apparatus of claim 1, wherein providing the response to the graph query includes executing the graph query based on the selected query path and, after executing the graph query, retrieving the data.

6. The apparatus of claim 1, wherein the metagraph is a bipartite graph that models the data stores in the plurality of data stores as nodes, models the identifiers as nodes, models the identifier acceptance information as edges, and models the identifier export information as edges.

7. The apparatus of claim 1, the actions further including updating the metagraph based on changes in the plurality of data stores.

8. The apparatus of claim 1, the actions further including caching the selected query path.

9. The apparatus of claim 1, the actions further including selecting a plurality of additional query paths for a plurality of additional graph queries in parallel with selecting the query path.

10. The apparatus of claim 1, wherein the plurality of data stores store a plurality of documents; the distributed graph includes at least one of a relational database or a not-only-Structured-Query-Language database, the distributed graph includes nodes and edges, the edges of the distributed graph include information about relationships between the nodes, and wherein the nodes include: for each user of a first plurality of users, a node that models that user; and, for each document of the plurality of documents stored in the plurality of data stores, a node that models that document.

11. A method, comprising:
accessing a graph query, wherein the graph query is associated with a distributed knowledge graph of a system, wherein the system includes a plurality of data stores, and wherein the graph query includes a request for data;
obtaining an identification (ID) resolution graph such that the ID resolution graph includes identifier information that is associated with identifiers, wherein the identifier information includes identifier acceptance information that is associated with which identifiers among the identifiers are accepted by the data stores in the plurality of data stores, and the identifier information further includes identifier export information that is associated with which identifiers among the identifiers are exported by the data stores in the plurality of data stores;
accessing cost information that is associated with costs of query paths among the data stores according to at least a first cost metric;
selecting, based on the ID resolution graph and the cost information, from among the query paths, a query path that is capable of satisfying the graph query based on optimization according to the first cost metric;

using the ID resolution graph and the cost information to change the selected query path upon determining that a failure has occurred in the selected query path; and responding to the graph query based on the selected query path.

12. The method of claim 11, wherein responding to the graph query includes executing the graph query based on the selected query path and, after executing the graph query, retrieving the data.

13. The method of claim 11, wherein the ID resolution graph is a bipartite graph that models the data stores in the plurality of data stores as nodes, models the identifiers as nodes, models the identifier acceptance information as edges, and models the identifier export information as edges.

14. The method of claim 11, further comprising updating the ID resolution graph based on changes in the plurality of data stores.

15. The method of claim 11, further comprising selecting a plurality of additional query paths for a plurality of additional graph queries in parallel with selecting the query path.

16. A processor-readable storage medium, having stored thereon processor-executable code that, upon execution by at least one processor, enables actions, comprising:

using a metagraph and cost information to select, from among query paths, a query path that is capable of fulfilling a graph query based on minimizing a cost according to a first cost metric, wherein the graph query is associated with a distributed graph of a system, the system includes a plurality of data stores, the graph query includes a request for data, the metagraph includes identifier information that is associated with identifiers, the identifier information includes identifier acceptance information that is associated with which identifiers among the identifiers are accepted by data stores in the plurality of data stores and further includes identifier export information that is associated with which identifiers among the identifiers are exported by the data stores in the plurality of data stores, and wherein the cost information is associated with costs of the query paths among the data stores according to at least the first cost metric;

upon determining that a failure has occurred in the selected query path, using the metagraph and the cost information to change the selected query path; and providing a response to the graph query based on the selected query path, wherein the response to the graph query includes the data.

17. The processor-readable storage medium of claim 16, wherein providing the response to the graph query includes executing the graph query based on the selected query path and, after executing the graph query, retrieving the data.

18. The processor-readable storage medium of claim 16, wherein the metagraph is a bipartite graph that models the data stores in the plurality of data stores as nodes, models the identifiers as nodes, models the identifier acceptance information as edges, and models the identifier export information as edges.

19. The processor-readable storage medium of claim 16, the actions further comprising updating the metagraph based on changes in the plurality of data stores.

20. The processor-readable storage medium of claim 16, the actions further comprising selecting a plurality of additional query paths for a plurality of additional graph queries in parallel with selecting the query path.

* * * * *